No. 776,724. PATENTED DEC. 6, 1904.
X. CAVERNO.
LIQUID SUPPLY SYSTEM.
APPLICATION FILED MAY 12, 1904.
NO MODEL.
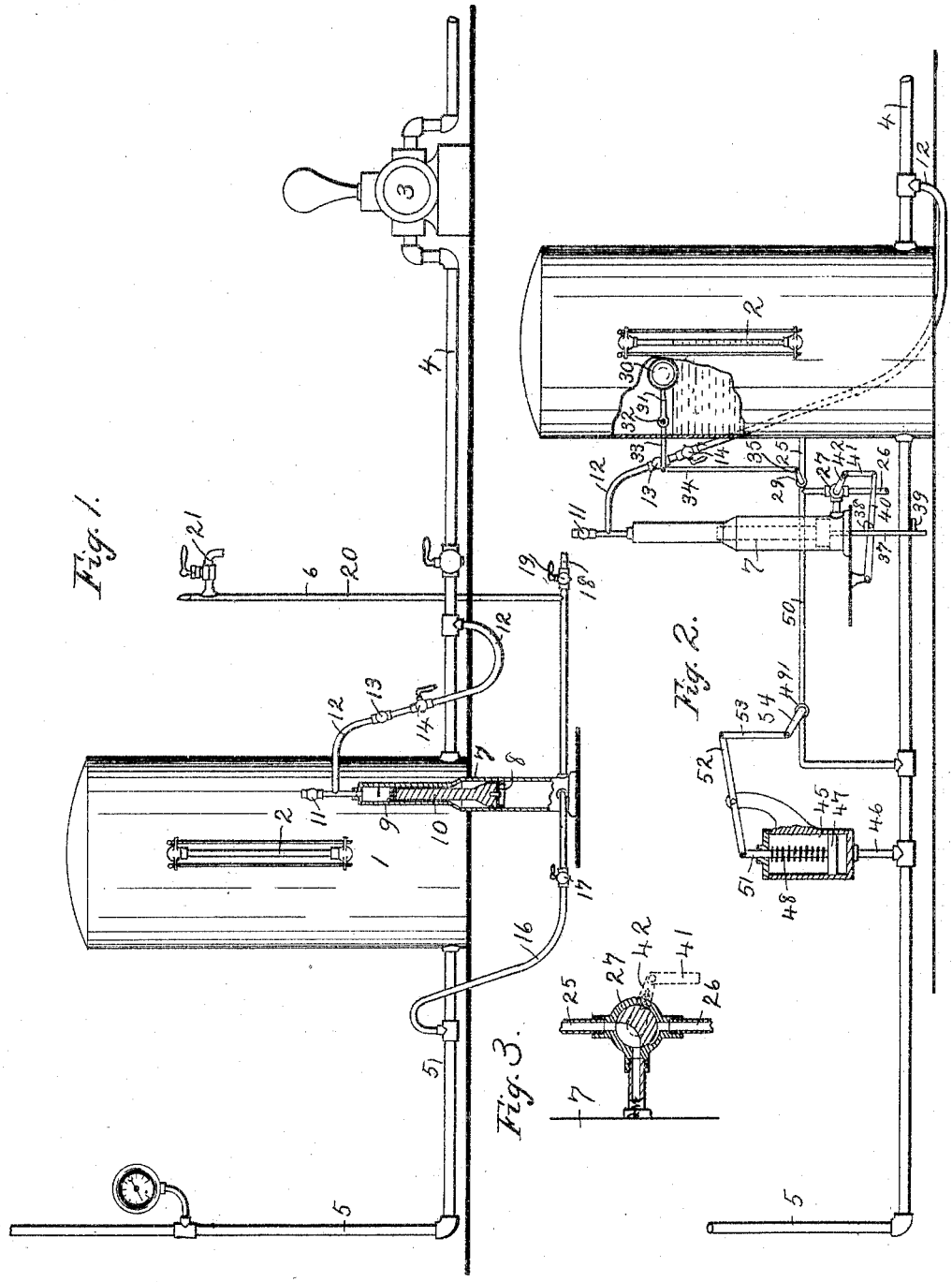
WITNESSES:
INVENTOR
Xenophon Caverno
BY Edwin E. Wheeler
ATTORNEYS.

No. 776,724.                                                    Patented December 6, 1904.

UNITED STATES PATENT OFFICE.

XENOPHON CAVERNO, OF KEWANEE, ILLINOIS, ASSIGNOR TO KEWANEE PNEUMATIC WATER SUPPLY COMPANY, OF KEWANEE, ILLINOIS, A CORPORATION OF ILLINOIS.

LIQUID-SUPPLY SYSTEM.

SPECIFICATION forming part of Letters Patent No. 776,724, dated December 6, 1904.

Application filed May 12, 1904. Serial No. 207,612. (No model.)

*To all whom it may concern:*

Be it known that I, XENOPHON CAVERNO, a citizen of the United States, residing at Kewanee, county of Henry, and State of Illinois, have invented new and useful Improvements in Liquid-Supply Systems, of which the following is a specification.

My invention relates to improvements in water and other liquid supply systems.

The object of my invention is to provide means for maintaining a supply of compressed air in closed water-supply tanks.

It is desirable to dispense with elevated tanks in water-supply systems; but a difficulty has been experienced in maintaining a sufficient air-supply in closed tanks owing to the absorption of air in the water and escape of air by leakage until the pressure becomes insufficient to lift the water to the desired elevation.

My invention contemplates utilizing a portion of the water for renewing the supply of air in the tank, also for utilizing the excess pressure of the water when the tank is newly filled for renewing the air-supply without waste of water, my invention being capable of either automatic or manual operation.

In the following description reference is had to the accompanying drawings, in which—

Figure 1 is a side view of my invention, showing the air-supply pump in vertical section and arranged for manual operation. Fig. 2 is a similar view showing the air-supply pump and connections for operating the same automatically. Fig. 3 is an enlarged sectional view of the two-way valve 27 shown in Fig. 2.

Like parts are identified by the same reference characters throughout the several views.

1 is a water-supply tank provided with a sight-glass 2, by means of which the height of the water in the tank may be ascertained.

3 is a pump for supplying water to the tank with which it is connected by a supply-pipe 4.

5 and 6 are service-pipes.

7 is a pump-cylinder having a water-actuated piston at 8 and an air-compressing piston at 9, the two pistons being connected by a weighted rod 10. The air-receiving end of the cylinder 7 is preferably reduced and provided with an air-inlet at 11, which admits air to the pump-cylinder during the downward movement of the pistons. During the upward movement of the pistons the air is discharged through the pipe 12 into the tank 1, the pipe 12 being preferably connected with pipe 4 to avoid multiplying the tank connections. A check-valve (indicated at 13) is located at any convenient point between the pump-cylinder and the tank, and a hand-valve 14 is also employed, the same being closed at all times except when the pump is in use.

Water is admitted to the lower end of the pump-cylinder through the pipe 16, leading from the service-pipe 5, the admission of the water being controlled by an ordinary cock at 17. The water thus admitted to the pump-cylinder lifts the piston 10 and forces the air in the upper end of the cylinder into the tank, as above explained. The water may then be permitted to exhaust from the pump-cylinder through the drain-pipe 18, provided with a cock 19, controlling its discharge, the cock 17 being closed when cock 19 is opened. Where the lift is not too great, a service-pipe 20 may be connected with the pipe 18 and provided with an ordinary faucet 21. In such case the cock 17 is left constantly open and the cock 19 constantly closed. Whenever the faucet 21 is opened, the pressure underneath the pump-piston 8 will be reduced to permit said piston to descend. When the faucet 21 is again closed, the pressure of the water is restored underneath the piston 8 to lift the piston and force air into the tank 1.

Referring to Fig. 2, it will be observed that the tank, with its supply and service pipe connections, are the same as in Fig. 1. The pump, however, is supplied from the tank by means of the pipe 25, the water being exhausted from the pump through the pipe 26, and a two-way valve 27 is employed to regulate the admission and discharge of the water from the pump. The pump supply-pipe 25 is also provided with a valve at 29, this valve being operated by a float 30 in the tank connected with the valve by a float-arm 31, rockshaft 32, arm 33, link 34, and valve-lever 35. Valve 27 being opened for the admission of water to the pump-cylinder, it will be seen that whenever the water in tank 2 is of sufficient height to lift float 30 motion may be communicated from said float to open valve 29, thus setting the pump in operation. The lower pump-piston 8 is provided with a detaining-rod 37, having projections 38 and 39, each respectively adapted to engage a valve-actuating lever 40 to actuate the valve 27 by means of the link 41 and valve-lever 42, whereby the pump-cylinder is alternately placed in communication with the supply and exhaust pipes 25 and 26, respectively, and the operation of the pump is thus made to proceed automatically until the water-supply in the tank 1 is lowered and permits a sufficient depression of the float 30 to close the valve 29.

Where it is not desired to rely upon the control of the pump by means of the float, a pressure-cylinder 45 is used. This cylinder is connected with the tank preferably by means of a pipe 46 and the service-pipe 5. A piston 47 in the cylinder is actuated by the water-pressure in opposition to a spring 48 to open a valve at 49, controlling the admission of water to the pump through the pipe 50, the piston being connected with the valve 49 by piston-rod 51, lever 52, link 53, and valve-lever 54. With this construction whenever the pressure in the tank 1 becomes sufficient to lift the piston 47 the valve 49 will be opened and the pump set in operation until the pressure is reduced sufficiently to permit the spring 48 to force piston 47 downwardly, and thus again close valve 49.

Having thus described my invention, what I claim as new, and desire to secure by Letters Patent, is—

1. In a liquid-supply system, the combination of a fluid-containing tank; means for supplying liquid thereto; an air-pump connected to supply air to the tank, and adapted to be operated by liquid under pressure; and connections for supplying liquid under pressure to the pump from the tank.

2. In a liquid-supply system, the combination of a fluid-containing tank; means for supplying liquid thereto; an air-pump connected to supply air to the tank and adapted to be operated by liquid under pressure; and connections for supplying liquid under pressure to the pump from the tank; together with means for controlling the supply and exhaust of the power liquid to and from the pump.

3. In a liquid-supply system, the combination of a fluid-containing tank; means for supplying liquid thereto; an air-pump connected to supply air to the tank, and adapted to be operated by liquid under pressure; and connections for supplying liquid under pressure to the pump from the tank; together with automatic means for controlling the supply and exhaust of the power liquid to and from the pump.

4. In a liquid-supply system, the combination of a fluid-containing tank; means for supplying liquid thereto; an air-pump connected to supply air to the tank, and adapted to be actuated by liquid under pressure; means, independent of the liquid-pressure, for actuating the air-pump to draw in air when the liquid-pressure is reduced; and means for varying the liquid-pressure in the pump and permitting the operation of said independent actuating means.

5. In a liquid-supply system, the combination of a fluid-containing tank; means for supplying liquid thereto; an air-pump cylinder having an air-compressing piston and connected to supply air to the tank; a liquid-cylinder provided with a piston connected to the air-pump piston; supply connections between the liquid-cylinder and the tank; valved discharge connections for said cylinder, and means for actuating the pistons against the pressure in said liquid-cylinder when said discharge connections are open.

6. In a liquid-supply system, the combination of a fluid-containing tank; means for supplying liquid thereto; an air-pump connected to supply air to the tank, and adapted to be actuated by liquid under pressure; connections adapted to supply such liquid to the pump from the tank, means, independent of the liquid-pressure, for actuating the air-pump to draw in air when the liquid-pressure is reduced; and means for varying the liquid-pressure in the pump and permitting the operation of said independent actuating means; together with means, controlled by the liquid in the tank, for admitting and cutting off the supply of such liquid to the pump, and setting the same in operation.

In testimony whereof I affix my signature in the presence of two witnesses.

XENOPHON CAVERNO.

Witnesses:
  CHAS. HYDE PRATT,
  HARRY RIDYARD ROBBINS.